United States Patent
Chang et al.

(10) Patent No.: US 8,547,712 B2
(45) Date of Patent: Oct. 1, 2013

(54) POWER CIRCUIT AND DIRECT CURRENT TO DIRECT CURRENT CONVERTER THEREOF

(75) Inventors: Edward-Yi Chang, Hsinchu County (TW); Shyr-Long Jeng, Tainan (TW); Ming-Tsan Peng, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 395 days.

(21) Appl. No.: 13/014,241

(22) Filed: Jan. 26, 2011

(65) Prior Publication Data

US 2012/0147640 A1 Jun. 14, 2012

(30) Foreign Application Priority Data

Dec. 8, 2010 (TW) .............................. 99142886 A

(51) Int. Cl.
  *H02M 3/335* (2006.01)
  *H02M 7/06* (2006.01)
  *H02M 7/217* (2006.01)

(52) U.S. Cl.
  USPC .................... 363/21.06; 363/126; 363/127

(58) Field of Classification Search
  USPC ........................................ 363/21.06, 126, 127
  See application file for complete search history.

(56) References Cited

U.S. PATENT DOCUMENTS

| | | | |
|---|---|---|---|
| 7,557,637 B2 | 7/2009 | Sakamoto | |
| 2006/0232253 A1* | 10/2006 | Salato et al. | 323/225 |
| 2006/0290407 A1* | 12/2006 | Salato et al. | 327/427 |
| 2007/0103946 A1* | 5/2007 | Kyono | 363/21.14 |
| 2007/0109826 A1* | 5/2007 | Lu | 363/125 |
| 2007/0159863 A1* | 7/2007 | Lu | 363/84 |
| 2009/0080223 A1* | 3/2009 | Wang et al. | 363/21.06 |
| 2009/0161391 A1* | 6/2009 | Matsumoto | 363/24 |

FOREIGN PATENT DOCUMENTS

| | | |
|---|---|---|
| TW | 576010 B | 2/2004 |
| TW | 1231100 | 4/2005 |
| TW | I261301 | 9/2006 |
| TW | 200826451 | 6/2008 |
| TW | I301012 | 9/2008 |
| TW | 201025847 | 7/2010 |

OTHER PUBLICATIONS

C Y Lu et al., Influence of the device geometry on the Schottky gate characteristics of AlGaN/GaN HEMTs, Semiconductor Science and Technology, 2010, p. 1-4, 25, 075005.

(Continued)

*Primary Examiner* — Jue Zhang
(74) *Attorney, Agent, or Firm* — Morris Manning & Martin LLP; Tim Tingkang Xia, Esq.

(57) ABSTRACT

A power circuit is applicable to a Direct Current (DC) to DC converter. The power circuit includes a gate driver circuit and a High Electron Mobility Transistor (HEMT). The gate driver circuit functions as a Sigmoid (S) function and controls a gate and a source of the HEMT with a cross voltage of the sigmoid (S) type function. Accordingly, an overall characteristic curve of the HEMT and the gate driver circuit is like a characteristic curve of a single rectifier diode, so as to achieve a rectifying, freewheeling, or reversing effect. In addition, since an energy loss is low when the HEMT is conducted, the energy loss of the whole power circuit is much less than that of a conventional diode.

13 Claims, 8 Drawing Sheets

(56) References Cited

OTHER PUBLICATIONS

Jui-Chien Huang et al., Linearity Characteristics of Field-Plated AlGaN/GaN High Electron Mobility Transistors for Microwave Applications, Japanese Journal of Applied Physics, 2010, p. 014103-1-4, 49.

Chien-I Kuo et al., RF Performance Improvement of Metamorphic High-Electron Mobility Transistor Using $(In_\chi Ga1-\chi As)m/(InAs)n$ Superlattice-Channel Structure for Millimeter-Wave Applications, IEEE Electron Device Letters, Jul. 2010, p. 677-679, vol. 31, No. 7.

Kazuo Shirakawa et al., A Large-Signal Characterization of an HEMT Using a Multilayered Neural Network, IEEE Transactions on Microwave Theory and Techniques, 1997, P1630-1633, vol. 45, No. 9.

Baoxing Chen, Isolated Half-Bridge Gate Driver with Integrated High-Side Supply, IEEE, 2008, P3615-3618.

Intellectual Property Office, Ministry of Economic Affairs, R.O.C., "Office Action", Jul. 24, 2013, Taiwan.

* cited by examiner

POWER CIRCUIT AND DIRECT CURRENT TO DIRECT CURRENT CONVERTER THEREOF

CROSS-REFERENCE TO RELATED APPLICATIONS

This non-provisional application claims priority under 35 U.S.C. §119(a) on Patent Application No(s). 099142886 filed in Taiwan, R.O.C. on Dec. 8, 2010, the entire contents of which are hereby incorporated by reference.

BACKGROUND

1. Field

The present disclosure relates to a power circuit and a Direct Current (DC) to DC converter thereof, and more particularly to a power circuit and a DC to DC converter thereof with a low circulation loss.

2. Related Art

A diode is quite widely applied to an electronic product. Usually, a rectifying function of the diode is used. That is to say, a rectifying effect is achieved with a characteristic that the diode is in a conducted state when in a forward bias condition and is in a cut-off state and not conducted when in a reverse bias condition.

When the diode is in the conducted state, all currents flow through the diode. At this time, energy consumed by the diode is a product obtained by multiplying a cut-off voltage of the diode by the current. That is to say, the larger the cut-off voltage of the diode or the current is, the larger the consumed energy (usually referred to as a circulation loss) will be. Therefore, in order to reduce the circulation loss of the diode, the current flowing through the diode and the cut-off voltage of the diode may be reduced. When the diode is used as a rectifier element, the current flowing through the diode usually is a main current, which has little chance to be reduced. The cut-off voltage of the diode is related to a structure and a material of the diode, for example, a forward bias (cut-off voltage) of a diode with silicon as the main material is approximately 0.7 volts (V), a cut-off voltage of a silicon carbide diode applicable to a high voltage is approximately from 1.0 V to 1.2 V, and a forward bias of a germanium diode is approximately 0.2 V.

In addition, when being used, the diode also generates a switching loss in addition to the circulation loss, in which the switching loss refers to a loss that occurs at the moment when the diode is switched to be conducted or cut-off. When the rectifier diode is applied to a current supplier, a bridge rectifier, a flyback DC to DC converter, or a forward DC to DC converter, the circulation loss and the switching loss usually occupy almost a half of the total energy loss of a power source supplier. Therefore, under the energy-saving trend, how to reduce the energy loss of the rectifier diode remains a subject continuously concerned by the industry.

SUMMARY

Accordingly, the present disclosure is a power circuit (the power circuit is applicable to power conversion, so as to form a rectifier circuit or a freewheeling circuit) and a DC to DC converter thereof, which may reduce a conducting loss (or referred to as a circulation loss) and a switching loss as well.

According to an embodiment, the present disclosure provides a power circuit, which comprises a High Electron Mobility Transistor (HEMT) and a gate driver circuit. An anode, a cathode, and a driving end of the gate driver circuit are respectively electrically connected to a drain, a source, and a gate of the HEMT. The gate driver circuit satisfies the following equation:

$$v_{GS}=V^+(1-e^{-v_{DS}/\beta})/1+e^{-v_{DS}/\beta}.$$

$V_{GS}$ is a voltage between the driving end and the cathode, $V_{DS}$ is a voltage between the anode and the cathode, and $\beta$ is a characteristic constant of the gate driver circuit.

According to an embodiment, the gate driver circuit comprises a first Zener diode, a second Zener diode, and a resistor. An anode of the first Zener diode is electrically connected to the source, a cathode of the second Zener diode is electrically connected to a cathode of the first Zener diode, and both ends of the resistor are respectively electrically connected to the drain and an anode of the second Zener diode. The HEMT satisfies the following characteristic equations:

$$i_D = I_{Dmax}\frac{1}{1+e^{-\frac{v_{GS}-\alpha V_T}{\gamma}}}, \text{ and}$$

$$\gamma = (1+\alpha)V_T/6.$$

$i_D$ is a current flowing through the drain, $\gamma$ is a scaling factor, $V_T$ is a cut-off voltage, $I_{Dmax}$ is a maximum value of the current flowing through the drain, and $\alpha$ is a characteristic constant of the HEMT.

According to an embodiment, the present disclosure provides a DC to DC converter, which comprises a control circuit, a primary side coil, a secondary side coil, a capacitor, and a rectifier circuit. The control circuit receives a power source and converts the power source into a voltage signal with a predetermined frequency. The primary side coil receives the voltage signal. The secondary side coil has a first end and a second end. The secondary side coil is configured correspondingly to the primary side coil, so as to generate a secondary side signal at the first end and the second end in response to the voltage signal. The capacitor has a first end and a second end, and the second end is electrically connected to the second end of the secondary side coil. The rectifier circuit has an anode and a cathode. The anode is electrically connected to the first end of the secondary side coil, and the cathode is electrically connected to the first end of the capacitor. The rectifier circuit comprises an HEMT and a gate driver circuit. An anode, a cathode, and a driving end of the gate driver circuit are respectively electrically connected to a drain, a source, and a gate of the HEMT. The gate driver circuit satisfies the following equation:

$$v_{GS}=V^+(1-e^{-v_{DS}/\beta})/1+e^{-v_{DS}/\beta}$$

$V_{GS}$ is a voltage between the driving end and the cathode, $V_{DS}$ is a voltage between the anode and the cathode, $\beta$ is a characteristic constant of the gate driver circuit.

Through the features of the power circuit (or referred to as the rectifier circuit), the gate driver circuit forms a cross voltage of a sigmoid (S) type function between the gate and the source of the HEMT, and after being operated according to the characteristic equations, the HEMT generates a rectification characteristic similar to the diode between the drain and the source thereof. In addition, the energy loss of the HEMT is directly proportional to a region area of the gate, and the energy loss thereof is much less than that of a conventional diode.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
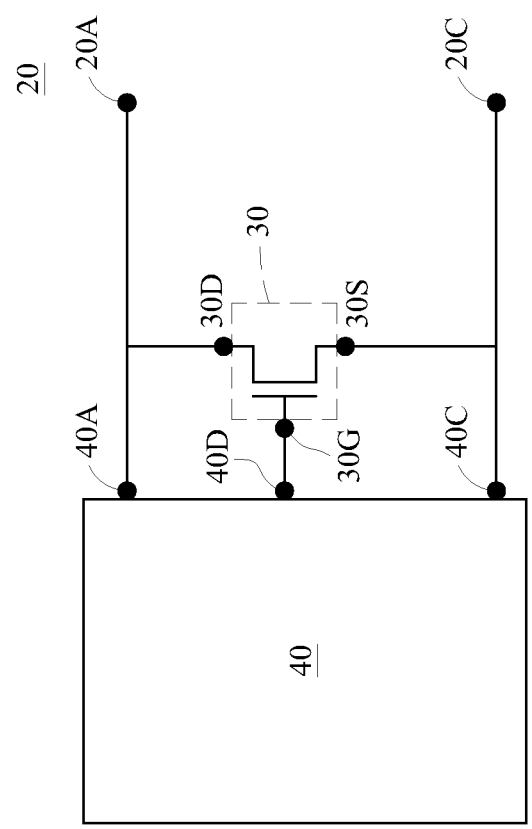
FIG. 1 is a schematic circuit block diagram of a rectifier circuit according to an embodiment of the present disclosure.

Firstly, referring to FIG. 1, it is a schematic circuit block diagram of a power circuit according to an embodiment of the present disclosure. It can be known from FIG. 1 that, a power circuit 20 comprises an HEMT 30 and a gate driver circuit 40. The power circuit 20 may generate a rectifying effect like a rectifier diode or a freewheeling function like a freewheeling diode (described in detail hereinafter). The power circuit 20 comprises an anode 20A and a cathode 20C. When a voltage applied to the anode 20A and the cathode 20C is a forward bias (that is, a voltage value of the anode 20A minus a voltage value of the cathode 20C is a positive value), the power circuit 20 conducts the anode 20A and the cathode 20C. On the contrary, when a voltage applied to the anode 20A and the cathode 20C is a reverse bias (that is, the voltage value of the anode 20A is smaller than the voltage value of the cathode 20C), the power circuit 20 cuts off an electrical connection between the anode 20A and the cathode 20C.

Figure 2:
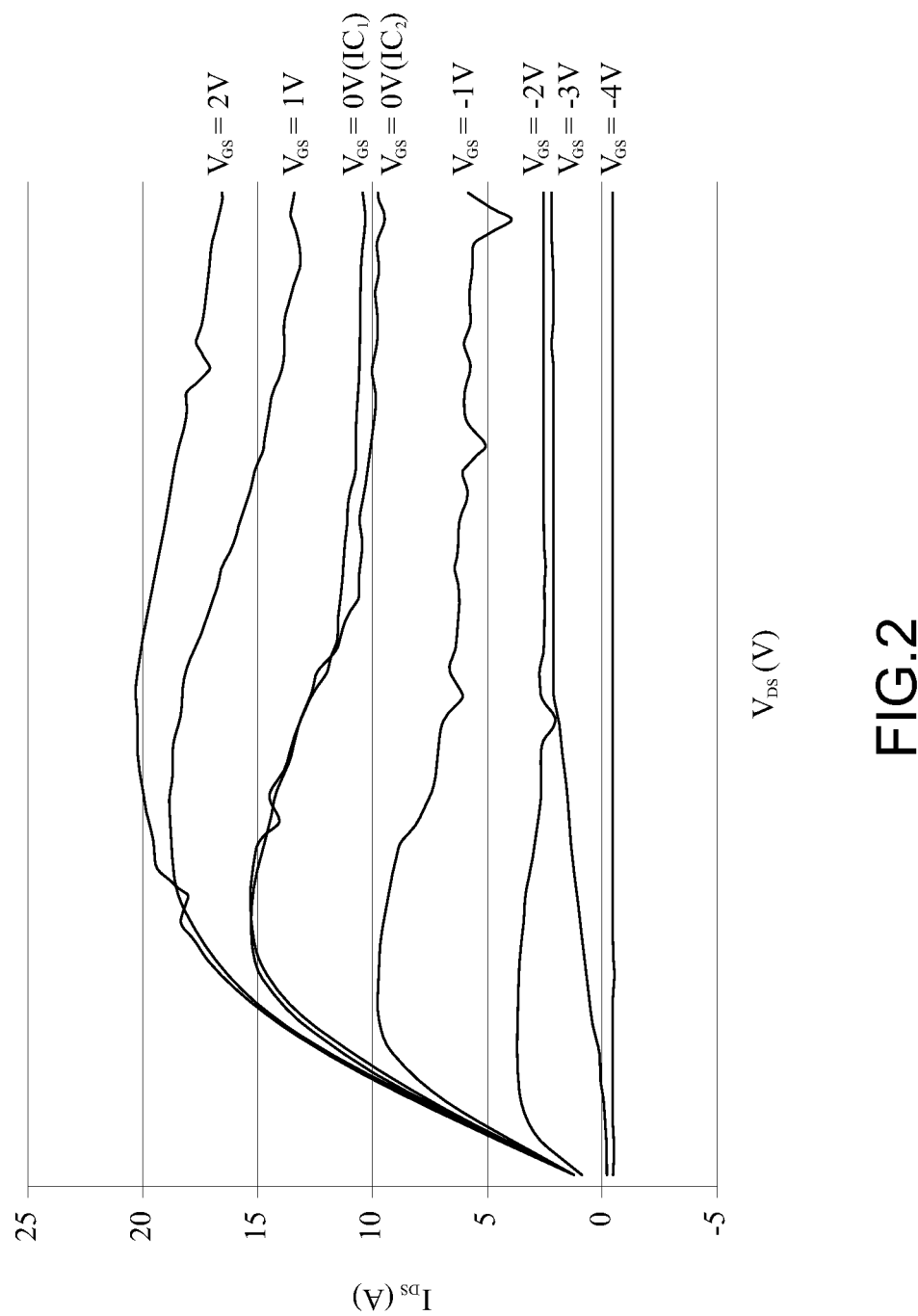
FIG. 2 is a schematic view of a voltage-current curve of an HEMT feature according to an embodiment of the present disclosure.

The HEMT 30 has a drain 30D, a gate 30G, and a source 30S. FIG. 2 is a schematic view of a voltage-current curve of an HEMT 30 feature according to an embodiment of the present disclosure. Referring to FIG. 2, a horizontal axis in FIG. 2 is a voltage value $V_{DS}$ between the drain 30D and the source 30S, a unit is volt (V), a vertical axis is a current value $I_{DS}$ between the drain 30D and the source 30S, and the curves in FIG. 2 respectively represent the $I_{DS}$-$V_{DS}$ characteristic curves at different voltages $V_{GS}$ between the gate 30G and the source 30S. It can be known from FIG. 2 that, the HEMT 30 is cut off (that is, a conducted state between the drain 30D and the source 30S is cut off) only when the voltage difference $V_{GS}$ between the gate and the source is smaller than −4V. On the contrary, as long as the voltage difference $V_{GS}$ between the gate and the source is larger than approximately −4V, the HEMT 30 is in a conducted state (that is, the drain 30D and the source 30S are conducted).

The HEMT 30 may be, but is not limited to, a GaN HEMT or an AlGaN HEMT, and may be a depletion mode HEMT, a normally-off HEMT, a depletion mode Metal-Oxide-Semiconductor Field-Effect Transistor (MOSFET), or a normally-off MOSFET.

Taking the GaN HEMT as an example, the GaN HEMT has a high breakdown voltage and can effectively reduce a conducting loss generated when being conducted, for which a reason is that a transistor with a high breakdown voltage may be designed to be very close to an electrode, so as to reduce a conducting loss when the current flows. The conducting loss of the GaN HEMT is reduced to be ⅕ than a silicon transistor, and the GaN HEMT has a fast switching characteristic at the same time, and thus, a switching loss thereof also can be reduced to be 1%. The GaN HEMT has characteristics of a high output power density, a high operating voltage, and a low switching loss. Under an operation of a pulse, an element is cut off for the first time, and in the case of a high voltage electric field, an electron is injected into a defect (a surface or a buffer layer defect). When a channel is opened, the bound electron cannot make response in time, and thus, an instant energy of a power transistor of the GaN HEMT is reduced. Because of a polarization phenomenon, the AlGaN HEMT or GaN HEMT has a two-dimensional electron gas (2DEG), and the electron has a high electron mobility, a low conducting resistance, and a high switching speed.

The characteristic curve shown in FIG. 2 is a typical DC characteristic curve of a depletion mode GaN HEMT of 20 millimeters (mm). When a voltage difference $V_{GS}$ between the gate 30G and the source 30S is zero, a maximum current is 20 amperes (A), a drain knee voltage thereof may be controlled between 1 V and 5 V according to differences in a process, and a cut-off voltage is approximately 200 V.

Characteristic Equations (1) and (2) of the HEMT are as follows:

$$i_D = I_{Dmax} \frac{1}{1+e^{-\frac{v_{GS}-aV_T}{\gamma}}};$$ Equation (1)

and $$\gamma = (1+\alpha)V^+/6.$$ Equation (2)

$i_D$ is a current flowing through the drain, $\gamma$ is a scaling factor, $V_T$ is a cut-off voltage, $I_{Dmax}$ is a maximum value of the current flowing through the drain, $\alpha$ is a characteristic constant of the HEMT and can be obtained by parameter fitting, and V+ is a constant.

The gate driver circuit 40 has an anode 40A, a cathode 40C, and a driving end 40D. The driving end 40D, the anode 40A, and the cathode 40C are respectively electrically connected to the gate 30G, the drain 30D, and the source 30S of the transistor 30. The gate driver circuit 40 satisfies the following Equation (3):

$$v_{GS}=V^+(1-e^{-v_{DS}/\beta})1+e^{-v_{DS}/\beta}$$ Equation (3).

$V_{GS}$ is a voltage difference between the driving end 40D and the cathode 40C (also referred to as a voltage difference between the gate 30G and the source 30S, and briefly referred to as a voltage difference $V_{GS}$ between the gate and the source), $V_{DS}$ is a voltage between the anode 40A and the cathode 40C (also referred to as a voltage difference between the drain 30D and the source 30S, and briefly referred to as a voltage difference $V_{DS}$ between the drain and the source), and β is a characteristic constant of a gate driver circuit 40 and may be obtained by parameter fitting.

Figure 3:
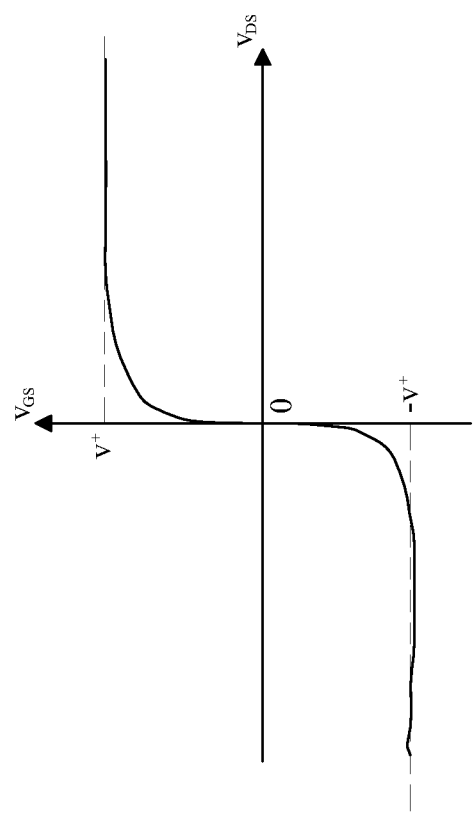
FIG. 3 is a schematic view of a $V_{GS}$-$V_{DS}$ characteristic curve of a gate driver circuit according to an embodiment of the present disclosure.

FIG. 3 is a schematic view of a $V_{GS}$-$V_{DS}$ characteristic curve of a gate driver circuit according to an embodiment of the present disclosure. When the gate driver circuit 40 satisfies the characteristic Equation (2), a characteristic curve between the voltage difference $V_{GS}$ between the gate and the source and the voltage difference $V_{DS}$ between the drain and the source is as shown in FIG. 3. As shown in FIG. 3, when the voltage difference $V_{DS}$ between the drain and the source is larger than zero, the gate driver circuit 40 outputs the voltage difference $V_{GS}$ between the gate and the source as +V. On the contrary, when the voltage difference $V_{DS}$ between the drain and the source is smaller than zero, the gate driver circuit 40 outputs the voltage difference $V_{GS}$ between the gate and the source as −V. Thus, a characteristic curve of an S type function is formed. In the S type function, when β in the Equation (3) approaches zero, the driving end 40D has no transitional region when being turned on or off.

Figure 4:
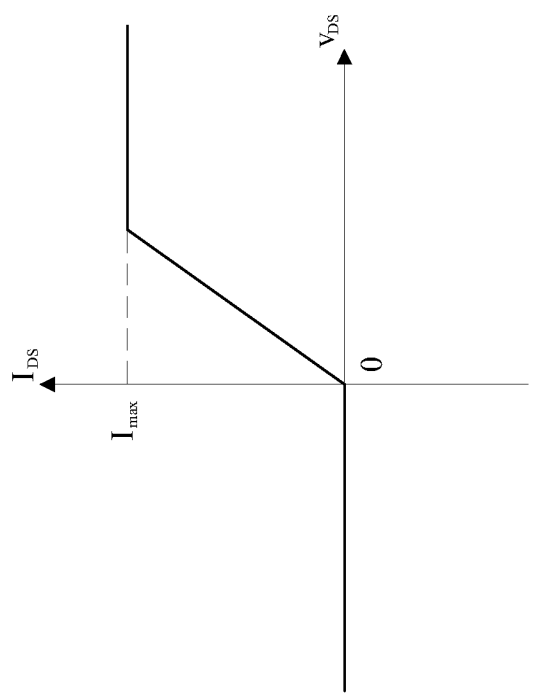
FIG. 4 is a schematic view of a desired characteristic curve of a rectifier circuit according to an embodiment of the present disclosure.

Therefore, by combining the HEMT 30 and the S type gate driver circuit 40, the characteristic curve of the power circuit 20 is as shown in FIG. 4. FIG. 4 is a schematic view of a desired characteristic curve of a power circuit according to an embodiment of the present disclosure. Referring to FIG. 4, a horizontal axis is a voltage difference between the anode 20A and the cathode 20C of the power circuit 20 (also referred to as a voltage difference $V_{DS}$ between the drain and the source of the transistor), and a vertical axis is a current value $I_{DS}$ between the anode 20A and the cathode 20C of the power circuit 20. It can be known from FIG. 4 that, when a forward bias is applied between the anode 20A and the cathode 20C of the power circuit 20, the anode 20A and the cathode 20C are conducted, and when the current between the anode 20A and the cathode 20C reaches a maximum value $I_{MAX}$, the voltage is directly proportional to the current.

Figure 5:
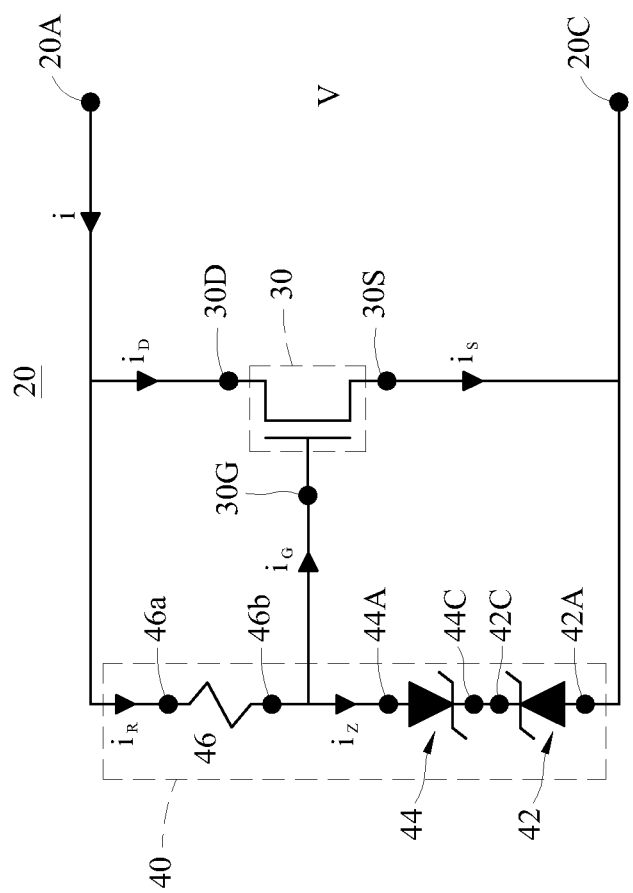
FIG. 5 is another schematic circuit block diagram of a rectifier circuit according to an embodiment of the present disclosure.

Then, FIG. 5 is another schematic circuit block diagram of a power circuit according to an embodiment of the present disclosure. As shown in FIG. 5, the power circuit 20 comprises an HEMT 30 and a gate driver circuit 40. The gate driver circuit 40 comprises a first Zener diode 42, a second Zener diode 44, and a resistor 46.

The first Zener diode 42 has an anode 42A and a cathode 42C. The second Zener diode 44 has an anode 44A and a cathode 44C. The anode 42A of the first Zener diode 42 is electrically connected to the source 30S of the HEMT 30 (that is, the cathode 20C of the power circuit 20). The cathode 42C of the first Zener diode 42 is electrically connected to the cathode 44C of the second Zener diode 44. Both ends 46a and 46b of the resistor 46 are respectively electrically connected to the drain 30D of the HEMT 30 and the anode 44A of the second Zener diode 44.

Referring to FIG. 5, according to the Kirchhoffs Current Law (KCL), the current flowing from the anode 20A of the power circuit 20 is equal to the current flowing into the HEMT 30 and the resistor 46, that is, $i=i_D+i_R$. Similarly, $i_R=i_Z+i_G$. It may be obtained that $V=i_R R1+V_{GS}$ according to the Kirchhoffs Voltage Law (KVL), in which R1 is a resistance value of the resistor 46, and V is a voltage difference between the anode 20A and the cathode 20C of the power circuit 20. They are applied to the Equations (1) and (2), and the following Equations (4) and (5) are obtained with the cut-off voltage ($V_T$) of the GaN HEMT:

$$\gamma = (1 + \alpha)V_T/6;$$ Equation (4)

and $$i_D = I_{Dmax} \frac{1}{1 + e^{6\left(\frac{\alpha}{1+\alpha} - \frac{v_{GS}}{(1+\alpha)V_T}\right)}}.$$ Equation (5)

A current-voltage relationship of the first Zener diode 42 and the second Zener diode 44 which are serially connected may be combined by the Gompertz equation, which is:

$$v_{GS} = V_{Z2} \frac{i_Z/\beta}{\sqrt{1 + (i_Z/\beta)^2}}.$$ Equation (6)

In the equation, $V_{Z2}=V_Z+V_\gamma$, and $i_Z=(V-V_{GS})/R1-i_G$, in which $i_Z$ is a current flowing through the second Zener diode 44, $V_Z$ is a reverse breakdown voltage of the Zener diode, and $V_\gamma$ is a forward conducting bias of the Zener diode. It is assumed that $i_G$ is very small and can be ignored, $i_Z=(V-V_{GS})/R1$, and a cross voltage from the gate to the source is calculated according to the following Equation (7):

$$(\beta R_1 v_{GS})^2 + (v-v_{GS})^2(v_{GS}^2-V_{Z2}^2)=0$$ Equation (7).

Figure 6:
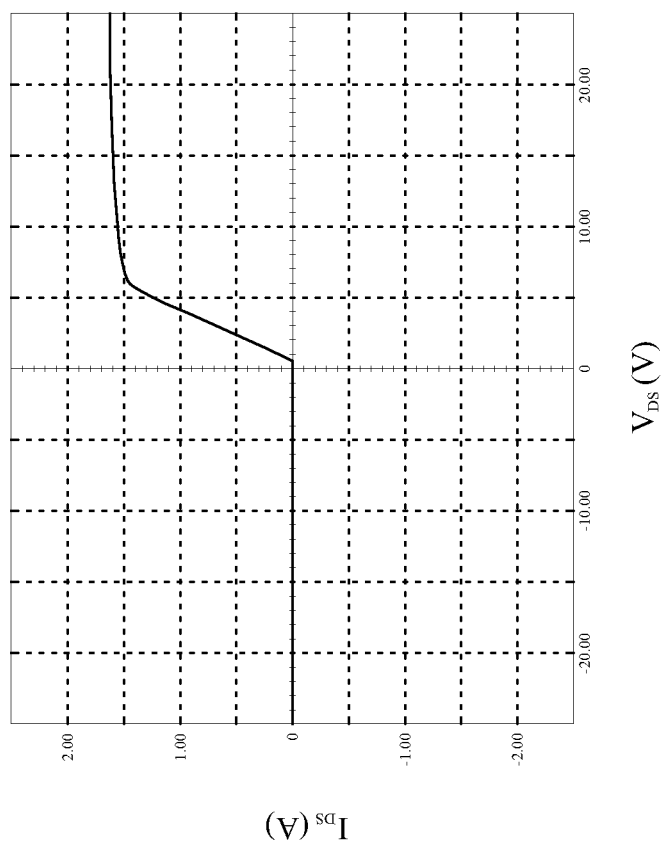
FIG. 6 is a schematic view of a characteristic curve of a rectifier circuit according to an embodiment of the present disclosure.

FIG. 6 is a schematic view of a characteristic curve of a power circuit according to an embodiment of the present disclosure. As shown in FIG. 6, a result coincides with a desired output result in FIG. 4. In addition, a comparative analysis is performed with respect to energy consumption between this embodiment and a conventional rectifier diode, and the energy consumption of the conventional diode may be denoted as $P \approx i^2 R$. For example, if a rectifier diode with a current of 4 A is taken as an example and a diode of a PSF10A40 type is used, the power consumption thereof is approximately 4 W, and for another example, if a common silicon carbide diode is used, the power consumption thereof is approximately 4.8 W. On the contrary, in this embodiment, if the GaN HEMT of 3 mΩ-cm² is used, and a gate region thereof is 5 mm², a conducting impedance of 0.06Ω and an energy loss of 0.96 W may be deduced and obtained. By comparison, the energy loss of this embodiment is approximately ¼ to ⅕ of that of the conventional one.

Figure 7:
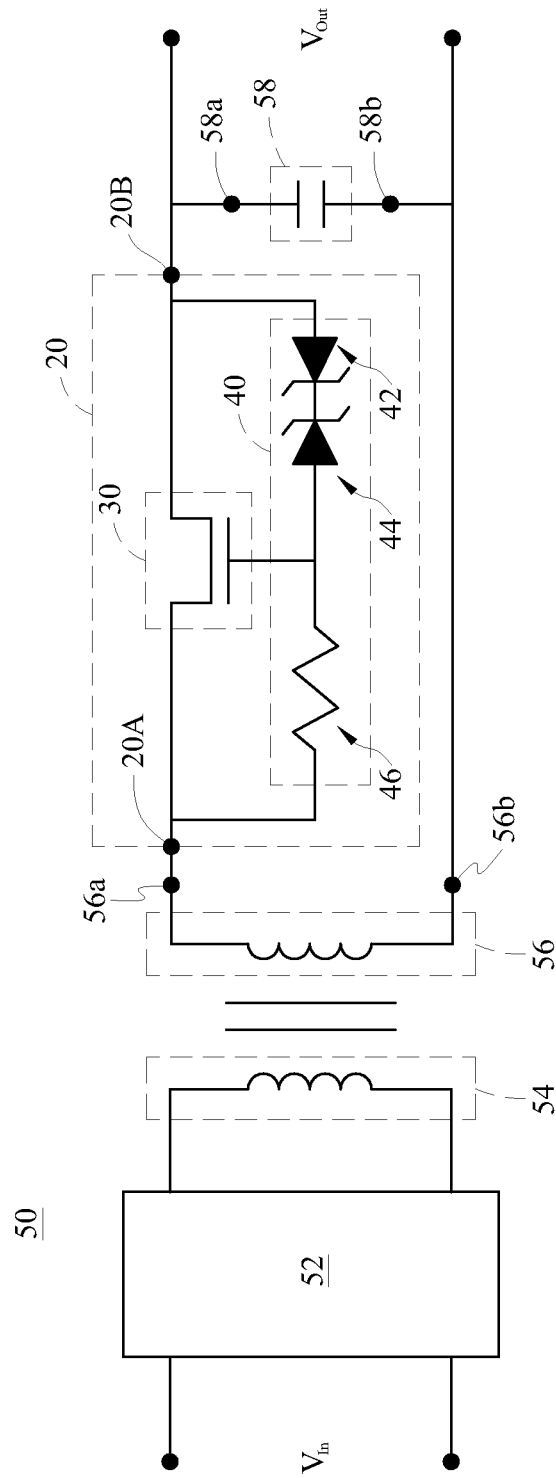
FIG. 7 is a schematic circuit block diagram of a DC to DC converter according to an embodiment of the present disclosure.

In addition, FIG. 7 is a schematic circuit block diagram of a DC to DC converter according to an embodiment of the present disclosure. It can be known from FIG. 7 that, a DC to DC converter 50 comprises a control circuit 52, a primary side coil 54, a secondary side coil 56, a rectifier circuit 20 (also referred to as a power conversion circuit, that is, the above power circuit 20 is applied as a rectifier circuit), and a capacitor 58.

The control circuit 52 receives a power source Vin and converts the power source into a voltage signal with a predetermined frequency. The primary side coil 54 receives the voltage signal. The secondary side coil 56 has a first end 56a and a second end 56b. The secondary side coil 56 is configured corresponding to the primary side coil 54, so as to generate a secondary side signal at the first end 56a and the second end 56b in response to the voltage signal of the primary side coil 54. The secondary side signal is generated in response to the predetermined frequency of the voltage signal of the primary side.

The second end 58b of the capacitor 58 is electrically connected to the second end 56b of the secondary side coil 56. The rectifier circuit 20 has an anode 20A and a cathode 20C. The anode 20A is electrically connected to the first end 56a of the secondary side coil 56, and the cathode 20C of the rectifier circuit 20 is electrically connected to the first end 58a of the capacitor 58.

The rectifier circuit 20 comprises an HEMT 30 and a gate driver circuit 40. The gate driver circuit 40 comprises a first Zener diode 42, a second Zener diode 44, and a resistor 46. After being serially connected as shown in FIG. 7, the resistor 46, the second Zener diode 44, and the first Zener diode 42 are connected in parallel with the HEMT 30, so as to form the above rectifier circuit 20. As the description made for the rectifier circuit 20, the rectifier circuit 20 may be regarded as a rectifier diode according to the efficacies thereof. Therefore, if the rectifier circuit 20 is matched with a suitable capacitor 58, the secondary side signal may be successfully rectified into a DC signal. Since the rectifier circuit 20 of this embodiment has an advantage of significantly reducing the circulation loss, the energy consumed by the DC to DC converter 50 may be effectively reduced if the rectifier circuit 20 is applied to the DC to DC converter 50.

Although the rectifier circuit 20 according to the present disclosure is applied to the DC to DC converter 50 in a manner shown in FIG. 7, it is not used to limit an application field of the rectifier circuit 20, and the rectifier circuit 20 according to the present disclosure may be adopted in any occasion where the rectifier circuit is necessary, such as a power converter, a flyback converter, a forward converter, or a transformer.

In addition, the power circuit 20 according to the present disclosure may also replace a freewheeling diode, for example, but is not limited to that both ends of the power circuit 20 are connected to two ends of an inductor and a resistor which are serially connected, and thus a freewheeling diode (also referred to as a flyback diode, a suppressor diode, and a catch diode) is formed, so as to eliminate a flyback phenomenon and a sudden voltage spike.

Figure 8:
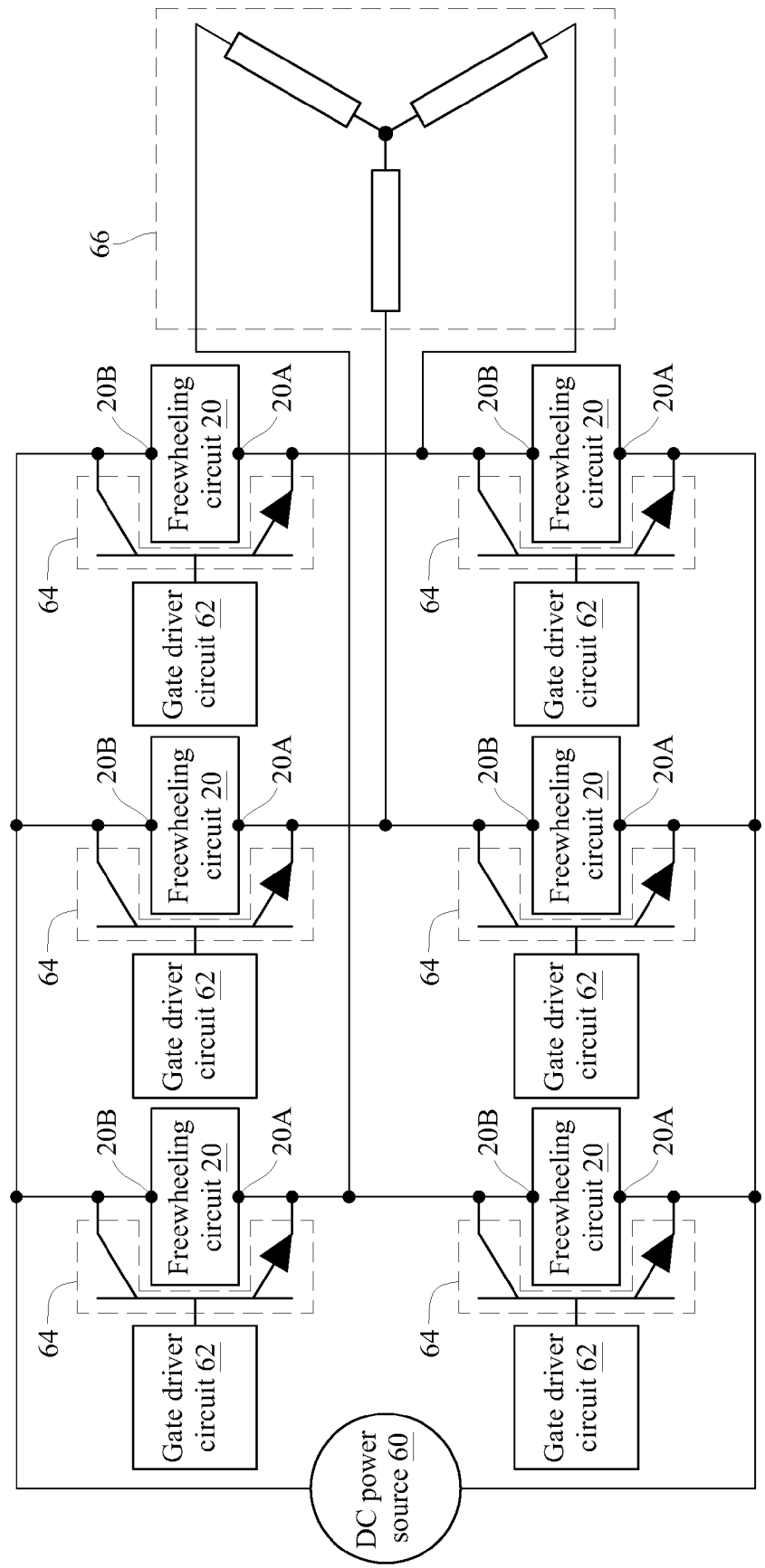
FIG. 8 is a schematic circuit block diagram of a three-phase motor control circuit according to an embodiment of the present disclosure.

Refer to FIG. 8 for the application of the power circuit 20 as a freewheeling circuit. FIG. 8 is a schematic circuit block diagram of a three-phase motor control circuit according to an embodiment of the present disclosure. It can be known from FIG. 8 that, the three-phase motor control circuit comprises a DC power source 60, a gate driver circuit 62, a power transistor 64, a freewheeling circuit 20 (that is, the power circuit 20 is applied as a freewheeling circuit), and a load 66.

The DC power source 60 generates a DC. The gate driver circuit 62 controls a gate of the power transistor 64, so that the whole circuit generates a control signal of the three-phase motor for the load 66. A detailed structure of the freewheeling circuit 20 is that of the above power circuit 20. By applying the power circuit 20 to the three-phase motor control circuit, the power circuit 20 is a freewheeling circuit 20. In the above example in which the power circuit 20 is applied to power conversion, the power circuit 20 is the above rectifier circuit 20 or the freewheeling circuit 20.

What is claimed is:

1. A power circuit, comprising:
   a High Electron Mobility Transistor (HEMT), having a drain, a source, and a gate; and
   a gate driver circuit, having an anode, a cathode, and a driving end, wherein the driving end and the cathode are respectively electrically connected to the gate and the source, the anode is electrically connected to the drain, and the gate driver circuit forms a cross voltage of a sigmoid (S) type function between the gate and the source.

2. The power circuit according to claim 1, wherein the gate driver circuit satisfies a following equation:

$$v_{GS} = V^+(1 - e^{-v_{DS}/\beta})/1 + e^{-v_{DS}/\beta},$$

wherein $V_{GS}$ is a voltage between the driving end and the cathode, $V_{DS}$ is a voltage between the anode and the cathode, $\beta$ is a characteristic constant of the gate driver circuit, and $V^+$ is a constant.

3. The power circuit according to claim 2, wherein the gate driver circuit comprises:
   a first Zener diode, having an anode and a cathode, wherein the anode is electrically connected to the source;
   a second Zener diode, having an anode and a cathode, wherein the cathode of the second Zener diode is electrically connected to the cathode of the first Zener diode; and
   a resistor, having both ends respectively electrically connected to the drain and the anode of the second Zener diode.

4. The power circuit according to claim 2, wherein the HEMT satisfies following characteristic equations:

$$i_D = I_{Dmax} \frac{1}{1 + e^{-\frac{v_{GS} - \alpha V_T}{\gamma}}}, \text{ and}$$

$$\gamma = (1 + \alpha)V_T/6,$$

wherein $i_D$ is a current flowing through the drain, $\gamma$ is a scaling factor, $V_T$ is a cut-off voltage, $I_{Dmax}$ is a maximum value of the current flowing through the drain, and $\alpha$ is a characteristic constant of the HEMT.

5. The power circuit according to claim 4, wherein the gate driver circuit comprises:
   a first Zener diode, having an anode and a cathode, wherein the anode is electrically connected to the source;
   a second Zener diode, having an anode and a cathode, wherein the cathode of the second Zener diode is electrically connected to the cathode of the first Zener diode; and
   a resistor, having both ends respectively electrically connected to the drain and the anode of the second Zener diode.

6. The power circuit according to claim 5, wherein the HEMT is a GaN HEMT or an AlGaN HEMT.

7. The power circuit according to claim 6, wherein the HEMT is a depletion mode HEMT or a normally-off HEMT.

8. A Direct Current (DC) to DC converter, comprising:
   a control circuit, receiving a power source and converting the power source into a voltage signal with a predetermined frequency;
   a primary side coil, receiving the voltage signal;
   a secondary side coil, having a first end and second end, wherein the secondary side coil is configured corresponding to the primary side coil, so as to generate a secondary side signal at the first end and the second end in response to the voltage signal;
   a capacitor, having a first end and a second end, wherein the second end is electrically connected to the second end of the secondary side coil; and
   a rectifier circuit, having an anode and a cathode, wherein the anode is electrically connected to the first end of the secondary side coil, and the cathode is electrically connected to the first end of the capacitor, and the rectifier circuit comprising:
      a High Electron Mobility Transistor (HEMT), having a drain, a source, and a gate; and
      a gate driver circuit, having an anode, a cathode, and a driving end, wherein the driving end and the cathode are respectively electrically connected to the gate and the source, the anode is electrically connected to the drain, and the gate driver circuit forms a cross voltage of a sigmoid (S) type function between the gate and the source.

9. The DC to DC converter according to claim 8, wherein the gate driver circuit satisfies a following equation:

$$v_{GS} = V^+(1 - e^{-v_{DS}/\beta})/1 + e^{-v_{DS}/\beta},$$

wherein $V_{GS}$ is a voltage between the driving end and the cathode, $V_{DS}$ is a voltage between the anode and the cathode, $\beta$ is a characteristic constant of the gate driver circuit, and $V^+$ is a constant.

10. The DC to DC converter according to claim 9, wherein the HEMT satisfies a following characteristic equation:

$$i_D = I_{Dmax} \frac{1}{1+e^{-\frac{v_{GS}-\alpha V_T}{\gamma}}},$$

wherein $i_D$ is a current flowing through the drain, $\gamma$ is a scaling factor, $V_T$ is a cut-off voltage, $I_{Dmax}$ is a maximum value of the current flowing through the drain, and $\alpha$ is a characteristic constant of the HEMT.

11. The DC to DC converter according to claim 10, wherein the gate driver circuit comprises:
   a first Zener diode, having an anode and a cathode, wherein the anode is electrically connected to the source;
   a second Zener diode, having an anode and a cathode, wherein the cathode of the second Zener diode is electrically connected to the cathode of the first Zener diode; and
   a resistor, having both ends respectively electrically connected to the drain and the anode of the second Zener diode.

12. The DC to DC converter according to claim 11, wherein the HEMT is a GaN HEMT or an AlGaN HEMT.

13. The DC to DC converter according to claim 12, wherein the HEMT is a depletion mode HEMT or a normally-off HEMT.

* * * * *